Dec. 11, 1951 M. E. PALMQUIST ET AL 2,578,587
FAUCET HOSE TEMPERATURE INDICATOR
Filed Aug. 16, 1949
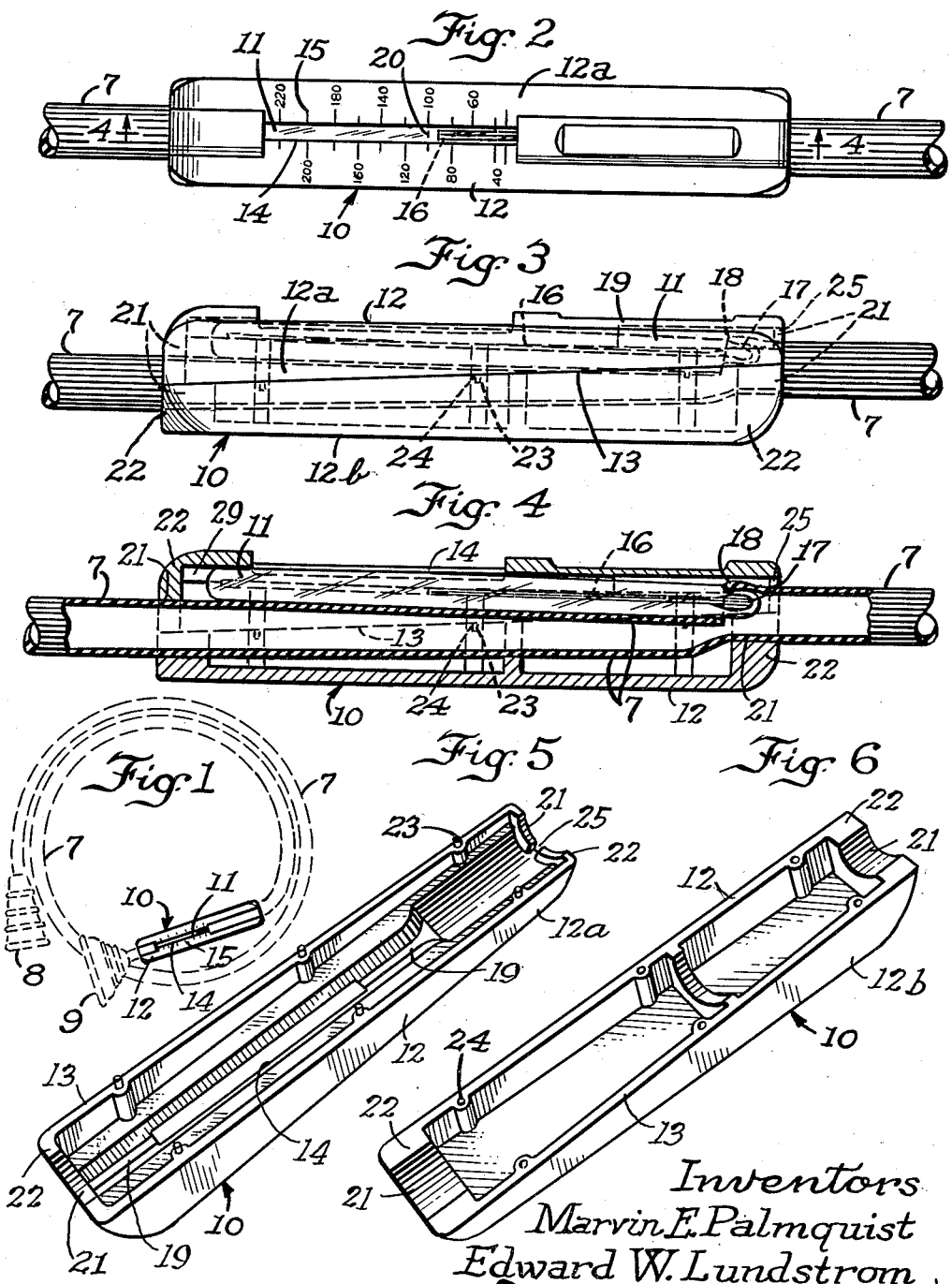
Inventors
Marvin E. Palmquist
Edward W. Lundstrom
Atty Patented Dec. 11, 1951

2,578,587

UNITED STATES PATENT OFFICE 2,578,587

FAUCET HOSE TEMPERATURE INDICATOR

Marvin E. Palmquist, Cherry Valley, and Edward W. Lundstrom, Rockford, Ill., assignors, by mesne assignments, to Trimble, Inc., Rochester, N. Y., a corporation of New York Application August 16, 1949, Serial No. 110,546

10 Claims. (Cl. 73—343)

This invention relates to a new and improved faucet hose temperature indicator.

We are aware that various efforts have been made to provide thermometers to indicate the temperature of water discharged from a faucet into a bath tub, or the like. However, most of the devices that have been proposed for this purpose have not been of a practical design, at least they were not suitable for indicating the temperature of water drawn for a baby's bath, for example, and that is, of course, one of the most important needs for a device of that kind. It is, therefore, the principal object of our invention to incorporate a thermometer in the bath spray hose attachable to faucets and bath tub fixtures in the filling of the baby's bath tub, whereby to indicate accurately the temperature of the water and thus avoid the danger of scalding or chilling the infant.

Another object of our invention is to mount the thermometer inside a two-piece plastic housing, designed to fit neatly over the hose at the point where the bulb end of the thermometer projects through a hole cut in the hose, so that the thermometer is assured of adequate support and protected against likelihood of breakage, and, where the housing is provided in close enough proximity to the spray nozzle, it serves also more or less as a handle for the spray nozzle, so that the mother or nurse can conveniently check the temperature from time to time as she fills the tub or uses the nozzle for spray purposes.

The invention is illustrated in the accompanying drawing, in which—

Fig. 1 is a general view of a bath spray hose equipped with a temperature indicator in accordance with our invention;

Fig. 2 is a front view of the temperature indicator shown on a larger scale, substantially full size;

Fig. 3 is a side view of Fig. 2;

Fig. 4 is a longitudinal section on the line 4—4 of Fig. 2, and

Figs. 5 and 6 are perspective views of the upper and lower halves of the plastic housing looking at the inside thereof.

The same reference numerals are applied to corresponding parts throughout the views.

While the present temperature indicating device was especially designed with a view to safer bathing of babies, it is also highly advantageous in the filling of hot water bottles for various purposes, shampooing hair both at home and in beauty shops and barber shops, and for all sorts of laundering where closer attention to the temperature of the water is required, as, for example, with delicate fabrics, woolen materials, which are well known to be subject to shrinkage when not laundered in cool enough water, and so forth. Thus, the following schedule of temperatures (in degrees Fahrenheit) is recommended for various uses of the present device:

| | |
|---|---|
| Baby bath | 95–100 |
| White cloth: | |
|   Wash | 140–160 |
|   Rinse | 120 |
| Fast color cottons: | |
|   Wash | 140 |
|   Rinse | 120 |
| Blue, pink cottons: | |
|   Wash | 100–110 |
|   Rinse | 85– 90 |
| Dark cottons: | |
|   Wash | 90 |
|   Rinse | 90 |
| Wool: | |
|   Wash | 85– 90 |
|   Rinse | 85– 90 |
| Rayon | 90–100 |
| Nylon | 80– 85 |
| Dishes, glass and silver: | |
|   Wash | 120 |
|   Rinse | 140–160 |
| Silks | 85– 90 |

Referring to the drawing, the reference numeral 7 designates the bath spray hose, on one end of which is the usual faucet or spigot adapter 8, and on the other end of which is the usual spray nozzle 9. The reference numeral 10 designates the temperature indicator of our invention generally, the same consisting of a thermometer 11 and an enclosing and supporting housing 12 made of plastic material, the same being split lengthwise and formed of two separately molded halves 12a and 12b, that are adapted to be cemented together along the parting line 13 in addition to being cemented or glued at the ends to the hose 7. The housing 12 has a longitudinally extending slot 14 in the upper half 12a, through which the thermometer 11 is visible, so that one may read the temperature on a scale 15 provided on the housing 12 adjacent the slot 14 relative to which the red temperature-responsive liquid 16 inside the thermometer 11 is adapted to rise with temperature increase of the water flowing through the hose 7. The housing 12, being disposed in close enough proximity to the spray nozzle 9 serves more or less as a handle for manipulating and directing the spray nozzle, while the operator from time to time checks the temperature of the water being discharged, so that proper adjustment can be made of the cold and hot water faucets on a bath fixture, for example, to keep the temperature of the water at or near a specified temperature for a given purpose.

The thermometer 11 has its bulb end 17 entered through a generally triangular-shaped hole 18 cut in the wall of the hose 7, and the rest of the thermometer is disposed lengthwise of the hose, resting in a groove 19 provided therefor on the inside of the upper half 12a of the housing 12. A transverse scratch or gauge-mark 20 is provided on the tube of the thermometer 11, which in the assembling of the device is placed in register with the 100° marking on the scale before the assembling operations are completed, so that the device 10 will give an accurate temperature reading, the gauge-mark 20 being the 100° temperature indication for the thermometer itself, and all of the thermometers being calibrated and marked for the same 100° temperature reading, to insure accuracy in the quantity production of the present devices. The two halves 12a and 12b of housing 12 are channel-shaped in cross-section, and made with thin walls for lightness and economy, leaving just enough room inside the housing to accommodate the included length of the hose, which is more or less distorted as a result of the insertion of the thermometer through the hole in the wall thereof. Half-round openings 21 are provided in the end walls 22 of the two halves 12a and 12b of housing 12 to accommodate the hose 7 with a close fit. Small dowel pin projections 23 are provided on the one housing half to fit in registering holes 24 provided in the other half, to facilitate registration of the halves in the assembling of the unit, and a small drain hole 25 is provided in the one half in the one end wall thereof, through which any water that might escape through the hole 18 and collect inside the housing 12 can be drained between uses of the hose. However, the fit of the thermometer 11 in the hole 18 is tight enough, so that very little, if any, water is apt to leak out, especially when the wall of the hose 7 is distorted by the movement of the thermometer tube substantially into parallelism with the perforated wall of the hose.

It is believed the foregoing description conveys a good understanding of the objects and advantages of our invention. The appended claims have been drawn to cover all legitimate modifications and adaptations.

We claim:

1. In combination, a hose of flexible resilient material having an opening provided in the wall thereof, a thermometer of elongated form having a heat responsive bulb end projecting through said opening, the rest of the length of said thermometer being disposed outside said hose, the hose material being distortable enough around said opening to allow moving said thermometer substantially into parallelism with and abutting the outside of said hose while the bulb end is disposed projecting through said opening, and an elongated rigid housing that is split lengthwise and has the hose and thermometer sandwiched between the halves thereof securing said thermometer in substantial parallelism to said hose, one half of the housing being constructed so as to expose the thermometer for temperature readings.

2. In combination, a hose of flexible resilient material having a hole provided in the wall thereof, a thermometer of elongated form having a heat responsive bulb end projecting through said opening, the rest of the length of said thermometer being disposed outside said hose, the hose material being distortable enough around said opening to allow moving said thermometer substantially into parallelism with and abutting the outside of said hose while the bulb end is disposed projecting through said hole, and a substantially rigid, elongated housing enclosing said thermometer and that portion of the length of hose abutted thereby holding the thermometer in the substantially parallel position described, said housing having an elongated slot provided therein through which a substantial portion of the length of said thermometer is exposed to view from the outside of the housing for reading temperatures thereby, and said housing having temperature graduations on the outside thereof spaced lengthwise of and adjacent said slot and in close enough proximity to said thermometer to permit taking temperature readings.

3. A structure as set forth in claim 2, wherein said housing is so elongated in relation to that portion of the length of the thermometer outside said hose that said housing may, in the assembling of the device, be shifted endwise on said hose relative to the thermometer in either direction, the thermometer having a gauge mark thereon indicating a predetermined temperature reading which when made to register with that same reading on the housing will enable accurate temperature readings above and below the said reading, the housing being thereafter permanently secured to the hose against relative endwise movement.

4. A structure as set forth in claim 2 wherein said housing is of 2-piece construction, the same being split lengthwise approximately in the plane of a diameter of said hose.

5. A structure as set forth in claim 2 wherein said housing is of 2-piece construction, the same being split lengthwise approximately in the plane of a diameter of said hose, the one half having the elongated slot therein and having an elongated groove provided therein on the inside thereof registering with and of greater length than said slot, that portion of the thermometer outside said hose engaging slidably in said groove for endwise adjustment relative to said housing, the thermometer having a gauge mark thereon indicating a predetermined temperature reading which when made to register with that same reading on the housing will enable accurate temperature readings above and below the said reading, the housing being thereafter permanently secured to the hose against relative endwise movement.

6. A structure as set forth in claim 2, wherein said housing has a drain hole provided therein for drainage of water from the inside thereof due to leakage through the hole in the hose that receives the bulb end of the thermometer.

7. A structure as set forth in claim 2 wherein said housing is of 2-piece construction, the same being split lengthwise approximately in the plane of a diameter of said hose, the one half having the elongated slot therein and having an elongated groove provided therein on the inside thereof registering with and of greater length than said slot, that portion of the thermometer outside said hose engaging slidably in said groove for endwise adjustment relative to said housing, the thermometer having a gauge mark thereon indicating a predetermined temperature reading which when made to register with that same reading on the housing will enable accurate temperature readings above and below the said reading, the housing being thereafter permanently secured to the hose against relative endwise movement, the same half in which the slot is provided also having a water drain hole provided therein in the end nearest the hole in the hose.

8. A structure as set forth in claim 2, wherein said housing is so elongated in relation to that portion of the length of the thermometer outside said hose that said housing may, in the assembling of the device, be shifted endwise on said hose relative to the thermometer in either direction to a position in which the temperature graduations on the housing are in the correct relationship to the thermometer, the housing being thereafter permanently secured to the hose against relative endwise movement.

9. A structure as set forth in claim 2, wherein said housing is of 2-piece construction, the same being split lengthwise approximately in the plane of a diameter of said hose, the one half having the elongated slot therein and having an elongated groove provided therein on the inside thereof registering with and of greater length than said slot, that portion of the thermometer outside said hose engaging slidably in said groove for endwise adjustment relative to said housing in either direction to a position in which the temperature graduations on the housing are in the correct relationship to the thermometer, the housing being thereafter permanently secured to the hose against relative endwise movement.

10. A structure as set forth in claim 2, wherein said housing is of 2-piece construction, the same being split lengthwise approximately in the plane of a diameter of said hose, the one half having the elongated slot therein and having an elongated groove provided therein on the inside thereof registering with and of greater length than said slot, that portion of the thermometer outside said hose engaging slidably in said groove for endwise adjustment relative to said housing in either direction to a position in which the temperature graduations on the housing are in the correct relationship to the thermometer, the housing being thereafter permanently secured to the hose against relative endwise movement, the same half in which the slot is provided also having a water drain hole provided therein in the end nearest the hole in the hose.

MARVIN E. PALMQUIST.
EDWARD W. LUNDSTROM.

REFERENCES CITED

The following references are of record in the file of this patent:

UNITED STATES PATENTS

| Number | Name | Date |
| --- | --- | --- |
| 338,045 | Easton | Mar. 16, 1886 |
| 605,178 | Ferguson | June 7, 1898 |
| 2,204,764 | Mayo | June 18, 1940 |